US008028043B2

(12) United States Patent
Hankejh et al.

(10) Patent No.: US 8,028,043 B2
(45) Date of Patent: Sep. 27, 2011

(54) REAL TIME INTERNET COMMUNICATIONS SYSTEM

(75) Inventors: Damion L. Hankejh, New York, NY (US); Hoa Ton-That, South Glastonbury, CT (US); Martin S. Rood, Lake Forest Park, WA (US)

(73) Assignee: InstantService.com, Inc., Seattle, WA (US)

( * ) Notice: Subject to any disclaimer, the term of this patent is extended or adjusted under 35 U.S.C. 154(b) by 0 days.

(21) Appl. No.: 11/981,737

(22) Filed: Oct. 31, 2007

(65) Prior Publication Data

US 2010/0257225 A1    Oct. 7, 2010

Related U.S. Application Data

(62) Division of application No. 10/793,181, filed on Mar. 3, 2004, now Pat. No. 7,346,671, which is a division of application No. 09/326,258, filed on Jun. 4, 1999, now Pat. No. 6,915,336.

(60) Provisional application No. 60/088,140, filed on Jun. 5, 1998, provisional application No. 60/088,141, filed on Jun. 5, 1998.

(51) Int. Cl.
*G06F 13/00*    (2006.01)

(52) U.S. Cl. .................. 709/219; 709/225; 709/229

(58) Field of Classification Search .................. 709/217, 709/219, 223, 225, 227, 228, 229
See application file for complete search history.

(56) References Cited

U.S. PATENT DOCUMENTS

| 5,572,643 A | 11/1996 | Judson |
| 5,574,784 A | 11/1996 | LaPadula et al. |
| 5,694,546 A | 12/1997 | Reisman |
| 5,764,916 A | 6/1998 | Busey et al. |
| 5,784,568 A | 7/1998 | Needham |
| 5,794,006 A | 8/1998 | Sanderman |
| 5,818,441 A | 10/1998 | Throckmorton et al. |
| 5,818,836 A | 10/1998 | DuVal |
| 5,828,839 A | 10/1998 | Moncreiff |
| 5,838,682 A | 11/1998 | Dekelbaum et al. |
| 5,862,330 A | 1/1999 | Anupam et al. |
| 5,878,219 A | 3/1999 | Vance et al. |
| 5,944,791 A | 8/1999 | Scherpbier |
| 5,958,014 A | 9/1999 | Cave |
| 5,960,173 A | 9/1999 | Tang et al. |
| 5,974,446 A | 10/1999 | Sonnenreich et al. |
| 5,987,401 A | 11/1999 | Trudeau |
| 5,990,887 A | 11/1999 | Redpath et al. |
| 6,046,762 A | 4/2000 | Sonesh et al. |
| 6,065,047 A | 5/2000 | Carpenter et al. |

(Continued)

OTHER PUBLICATIONS

Archways: Making Remote Multimedia Conversations Persistent and Natural, Ahuja et al, http://www.cs.columbia.edu/.about.doree/archways/telecom95/Archways.html, printed Aug. 24, 2006.

(Continued)

*Primary Examiner* — Viet Vu
(74) *Attorney, Agent, or Firm* — Squire, Sanders & Dempsey (US) LLP

(57) ABSTRACT

A novel real time internet communication system is disclosed. It is a novel way for users to collaborate on the fly, and without having to own or download any programs that then stay resident on the user's computer. It is marketed under a novel business system that makes highly productive software available to businesses and end users, but which is not purchased by customers or end users, has no conventional distribution system, and never requires update, installation or roll-out by the customer or end user.

21 Claims, 3 Drawing Sheets

U.S. PATENT DOCUMENTS

| | | |
|---|---|---|
| 6,078,948 A | 6/2000 | Podgorny et al. |
| 6,108,711 A | 8/2000 | Beck et al. |
| 6,144,991 A | 11/2000 | England |
| 6,167,432 A | 12/2000 | Jiang |
| 6,212,178 B1 | 4/2001 | Beck et al. |
| 6,230,197 B1 | 5/2001 | Beck et al. |
| 6,240,444 B1 | 5/2001 | Fin et al. |
| 6,295,550 B1 | 9/2001 | Choung et al. |
| 6,370,563 B2 | 4/2002 | Murakami et al. |
| 6,381,640 B1 | 4/2002 | Beck et al. |
| 6,449,646 B1 | 9/2002 | Sikora et al. |
| 6,493,447 B1 | 12/2002 | Goss et al. |
| 6,560,707 B2 | 5/2003 | Curtis et al. |
| 6,657,990 B1 | 12/2003 | Dilip et al. |
| 6,690,654 B2 | 2/2004 | Elliot et al. |
| 6,785,708 B1 | 8/2004 | Busey et al. |
| 6,915,628 B2 | 7/2005 | Kamoto et al. |
| 2001/0054064 A1 | 12/2001 | Kannan |
| 2002/0194272 A1 | 12/2002 | Zhu |

OTHER PUBLICATIONS

Image File Wrapper of U.S. Appl. No. 09/326,258, electronically captured on Aug. 20, 2010.

Image File Wrapper of U.S. Appl. No. 10/793,181, electronically captured on Aug. 20, 2010.

Image File Wrapper of U.S. Appl. No. 11/978,539, electronically captured on Aug. 20, 2010.

REAL TIME INTERNET COMMUNICATIONS SYSTEM

This application is a Division of application Ser. No. 10/793,181 filed Mar. 3, 2004 now U.S. Pat. No. 7,346,671, which is a Division of application Ser. No. 09/326,258 filed Jun. 4, 1999, now issued Jul. 5, 2005 as U.S. Pat. No. 6,915,336, which claimed priority to Provisional Application Ser. No. 60/088,140 filed Jun. 5, 1998 and Ser. No. 60/088,141 filed Jun. 5, 1998.

TECHNICAL FIELD

The invention relates to global network communications systems; more particularly, it relates to system and processes for a real time internet communications system.

BACKGROUND OF THE INVENTION

New Internet communication functions have been developed in the last few years. Net users (that is, persons browsing or surfing on the Net) can enter virtual 'rooms' and 'chat' with each other. In another recently known function, two users can each run a program that works in conjunction with their browsers that allows one (the 'leader') to control the other user's browser, at least to the extent of pointing that browser to a location on the Net chosen by the leader. More recently appearing are various collaboration programs that, when all collaborators are running the program and are all logged onto the Internet, allow a preselected group of users to collaborate.

What is needed is a way for users to collaborate on the fly, and without having to own or download any programs that then stay resident on the user's computer.

Conventionally, there are only variations on shrink wrap and click wrap sales of software as product, with conventional business models for this kind of commerce. But software sales in these models all to some extent create a need for updates and distributions and rollouts that are expensive and time consuming.

What is needed is a business system that makes highly productive software available to businesses and end users, but which is not purchased by customers or end users, has no conventional distribution system, and never requires update, installation or rollout by the customer or end user.

Some of these concerns have been addressed by a variety of companies with differing levels of technology. They range from the "poorly financed and positioned" to the "very well funded with strong niche markets". At this time, however, it is believed there are no comparable available technologies. There are also no known comparable business systems.

DISCLOSURE OF THE INVENTION

A novel real time internet communication system is disclosed. It is a novel way for users to collaborate on the fly, and without having to own or download any programs that then stay resident on the user's computer. It is marketed under a novel business system that makes highly productive software available to businesses and end users, but which is not purchased by customers or end users, has no conventional distribution system, and never requires update, installation or rollout by the customer or end user. In a preferred embodiment, this system is referred to herein as the iSession system or just iSession.

In the iSession system, customers of the system are referred to herein as Clients, while end users are referred to as Users if they are customers, employees, researchers or educators and students of a Client, or as Agents if they are particular customer service or sales agents or employees of a Client. The system is a client/server type system, and the server or any part of it is generally referred to as the iSession server or iServer, while the client portion of the system is referred to as an iSession client or iClient.

A novel business system is also disclosed. A company owns a client/server based information management system, for example a real time internet communications system. No part of the system is for sale, no software or hardware is sold, or conventionally distributed, to Client or User. Instead, and in basic terms only, a business desiring to make the system available to its end users becomes a customer subscriber (Client) to the company, and provides approved hyperlinks on its web site pages to the iServer after a sign up process that sets up the Client's preferences for its own use and default preferences for its end users' uses. The Client pays a subscription rate to the company based only on end user usage, measured for example either in minutes of use, or instances (hits) of use. Agents and Users then make use of the system as described herein. This usage is noted and recorded by the iServer and the Client receives invoices or statements from the company based on the usage information stored in the iServer and the agreed subscription rate. Optionally a VAR or other reseller of the iSession service enters into a sales relationship with the company to sign up other businesses. In other respects however, the usage information and invoicing from the company remains substantially the same; the VAR then internally receives its agreed share of usage revenue from the company.

iSession dramatically improves the effectiveness of communication across the Internet. iSession is the first technological solution to effectively provide integration of live multi-user dialogue and operator driven browsing capabilities in one window (or "session"), wherever User or Client so desire (optional related but floating viewer and chat control portions of the system are also available). This technology significantly impacts the web in four primary environments; they include sales, collaboration, training, and support, in such industries as electronic commerce, all areas of the medical field, brokerage services, travel services, technical support, and automotive enterprises.

Users can click on an iSession button, located on their favorite website, and immediately begin a real-time dialogue with live sales or service personnel who can directly answer questions, make sales and lead users to any desired location on the web.

iSession offers real-time, text based, dialogue between 'corporate' operators and 'consumer' end user browsers, or between any number of users themselves, while giving the User-leader complete ability to drive one or more client browsers to desired locations on the web. In addition, for collaborative usage the drivers seat (or baton) can be passed from user to user enabling any participant to lead the others to any destination on the web. Private "sidebar" discussion features are an optional means to enhance operator presentations or multi-user collaborations.

With the new technology disclosed herein, there is no need for a User or Client installation of a resident program; the only installation is on the fly and directed transparently by the iSession server, at the Request, of course, of the user. What is downloaded is an ETC or Extremely Thin Client applet of Java based code. No selection in advance or purchase or setup by the user is ever required, and there is no user maintenance whatever; in fact, upgrades all happen on the server and every user download of the ETC is always fresh and fully up-to-date.

When the user hits an iSession link on a web page, a request to the iSession server is generated to build on the fly a particularized instance of a user iClient applet. A cookie is left as a former iSession user is checked for; if no cookie is found, then a request for ID is sent to the user; if a cookie is found, there is a verification of cookie ID. Optionally, during this initial checking process, the page from which the user clicked the hyperlink is also checked for and passed along to the iServer. There is also an optional chance at about this point in the process for the user to enter his "question" for the agent. This iClient is first generated as a DHTML applet tag from iSession database information, if available for the user, and if no 'user' entry is found in the database, then a default iClient (preferably configurable for each Client) is served to the user, in either case via standard Apache webserver http stream. In one embodiment, the first thing that is shipped or served is about a 7K "webload" java applet that mediates and controls the rest of the iClient download, along with a cookie if one is not already in place on the user machine. All of this is invisible to the user, running as it does in the background, and can be concurrent with other computer and/or Internet processes by loading into an invisible frame. An optional concurrent message (the only thing visible to the user at this time) is displayed in the user's browser to the effect of 'we're connecting you to _', or the like.

The above referred to DHTML applet tag has parameters that the user browser uses (by means of a standard process with which the skilled artisan will be familiar) to do the actual request for the configured Java applet that will then provide the connection with the iSession switching cloud and other process disclosed herein. The iClient Java applet is also, when received, cached on the user machine in a standard way. The download of the rest of the iClient desirably takes advantage of the well known 'burst phenomenon' and Burst Advantage Architecture (BAA). Because of Internet phenomena and page variables like line speed, TCP/IP protocols, browser loading characteristics, and number of available concurrent sockets, the balance of the iClient download to the user is broken into 12-24 pieces or blocks and sent piecemeal to the user (break and send). In a preferred embodiment, there is no initial 'webload' applet; instead the entire iClient is broken down into about 20-30 modules or applets, all of which are downloaded as described herein. Then when all of the iClient is downloaded and assembled, the whole applet is run, and the Viewer appears on the user screen for the first time in the session, or preferably one small applet is run which then calls and controls all the other applets that make up the iClient.

The Viewer screen is divided into four primary areas, running preferably rectilinearly from top to bottom of the screen: a largest area for viewers, a strip for various avatars, a strip for chat text, and a strip for a chat input line.

When user(s) and agent are joined in a channel, they are communicating through the iServer acting as a proxy in a well known manner. But all Net content comes directly from the Net to both user and agent. On the other hand, chat lines (text for now), which do first go to the iServer, are then sent from the iServer to the agent and all other room occupants (users). That way, the chat entrant knows that when she sees the line in the chat room window, everyone can see it.

This innovative system significantly improves the effectiveness, value, and overall return on most Internet, Intranet, and Extranet sites. Businesses will be able to immediately 'answer' the questions of those who are browsing their site without the assistance of a plug-in, 1-800 service, an additional application, added hardware, or a high-speed connection. Clients of iSession access the system by attaching a link from their website to a pre-authorized proprietary address.

There is no installation required on the host server and nothing to download to the Client. Thus, it enables quick customer sign up, without MIS assistance, and immediate scaling capabilities. Upgrades to iSession are made instantly. There is no slow and costly upgrade distribution system. Upgrades are made (quite literally) overnight on the Internet. Preferably, every new release of iServer/iClient software is backward compatible with the last release of iClient to prevent channel loss at system upgrade switchover.

iSession is designed to compensate for existing low bandwidth, low memory, hardware and software environments as well as future high-bandwidth platforms. iSession easily integrates the usage of voice and video where bandwidth constraints are not an issue. An iSession communications system offers the unique ability to send reliable bi-directional packet streams over HTTP as well as over TCP and UDP. The unique design of the communication system enables 1 to 1, or 1 to many, communication on unlimited scale. The leader can quickly drive every participant's browser to any location on the web. This makes an iSession system ideal for use with live Internet sales, customer service and unprecedented collaboration in both range and scale.

iSession reporting systems for call center management include the following: (1) Full Archiving of each session—This helps to improve employee performance with direct feedback on technique and strategy. Every event in a session is stored as a date/time stamped transaction, creating a comprehensive pool of data for analysis. (2) Usage reports—Managers are able to quickly evaluate staff performance, training & marketing effectiveness, product interest, subject interest, and the like. (3) Customer "In queue" reporting—Managers and support staff can identify iSession demand, staffing needs and marketing campaign performance. In addition, iSession's network will make suggestions (via secure e-mail) when the analysis shows where iSession-based performance can improve through resource management. iSession also creates a market trends report, helping Clients to identify market shifts on a real-time basis. (4) Collaborative Reporting—Leaders can identify meeting attendance for certification purposes and identify subject interest and understanding based on session attendance and interaction.

In the iSession system, zero downtime and a fault-tolerant environment are assigned the highest priority; thus iSession servers are not randomly collocated with ISP's across the Internet. Rather, complete product supervision is undertaken in a proprietary controlled server bank, where specially trained technicians monitor the iSession servers 24×7 with high-level redundancy to ensure 100% product reliability. This differentiating factor prevents any delay in the communication between two iSession users. To these ends the Sun platform is preferably employed.

The iSession system is a new Internet communication category. Now, through the simple click of a button, users can enjoy real-time one-to-one or one-to-many dialogue, all while concurrently browsing the Internet. Applications for iSession include customer service, live sales assistance, collaborative research and online interactive training. Each user connection is commonly referred to as a "seat", and iSession can support around 20,000 seats in a single session. Each Client determines the maximum number of seats in an iSession (that is, the number of one-to-one sessions the Client wishes to support). And to add to its appeal, iSession technology is seamless to the users, requiring no troublesome software to download as well as no server maintenance on a Client's side.

The simple interface and intuitive operation of the iSession system from the users' point of view allows it to be used by novice and professionals alike. One underlying objective is to serve as a universal dialogue interface between WEB hosts (Clients) and their visitors (Users), regardless of language, technical skills or computer hardware, although certain minimum standards are of course required to access the WEB. Companies, organizations and groups can use iSession technology to increase the overall responsiveness towards the needs of their patrons.

Companies that provide training services and courseware can now use iSession as a supplemental tool. Sales organizations can use iSession to increase efficiency, sales and profits. Through iSession, groups will be able to conduct online presentations regardless of their location (provided they have a computer and an Internet connection). Research organizations can use iSession to exchange real-time information and findings online. Educational organizations can use iSession to teach classes, grade tests and interact with students. And finally, customer service organizations can provide real-time support on the Internet through iSession technology.

Preferred features and their respective implementations are summarized in the table below.

| | Feature | Detail |
|---|---|---|
| | iSession Feature implementation list | |
| 1 | Client side download progress indicator displayed while client is being launched/loaded. | By caching some pieces of the client throughout a Web site viewer's first page accesses, the "download progress indicator" will appear to download the client even faster than it really does. |
| 2 | Real Time Typing (Asynchronous vs. synchronous typing/display) | With minimal impact on Systran (translation system, or other back end integrations, a user may watch as the other person types (ie letter by letter) their comments or questions. A preferred translation server, Systran, does currently require an entire sentence to translate, and the server currently thus analyses sentence/grammar structure before translating, with a correspondingly long wait between sentences. While such broken talk may work in some languages, it may present problems in others; thus a 'live' type/display is expected to be more effective. Where translation is more critical, translation can still be let go sentence by sentence. |
| 3 | Support Rep can circle/highlight items on client screen | Circling text or imagery would be significantly better than text selection. |
| 4 | Resume Focus on chat window for leader dialog | Leadership requires flipping between iSession screen and Browser window. When Leader returns to iSession window, focus is resumed on chat dialog input box. |
| 5 | Don't send Leader's URL to Leader | Option is toggle-able for leader to not receive her own location. |
| 6 | Collaborative Form Population | Leader could fill out forms, a field at a time on customer's form. This could be done as (a) conventional proxy location that caches the pages from partner server (b) conventional javascript form population where iSession is Frames-Based, or (c) Java Window for form population. |
| 7 | Leader sends popup windows contained in java applet | same as #6 above |
| 8 | Agent view 1: Call center style availability | Each 'support agent' is able to set their options, like available or not available, avatar style, and macros or pre-recorded urls or phrases. |
| 9 | Leader could leave the current page open, but still send another page to the followers | Leader can force a new browser to launch on the follower-side(s). |
| 11 | Availability/Online status. Knowledge of rep availability on other side prior to clicking on 'lips' | This would compliment and wrap into the Support Views/Special setup (see below). |
| 18 | Unique Session ID URL, room, pager when connecting | When user connects, CGI can optionally be use on partner's server to create the 'session' as unique for the partner's support agent and client. |
| 20 | Paging/Notification of connection, Leader | Paging/message alert Just a note on paging - pops up a dialog on the recipient-side. |
| 21 | Paging/Notification of connection, clients/customers | |
| 24 | Voice messaging | Voice messages on the client side - "incoming chat request", "system message", or the like. |
| 28 | "Availability" settings for leaders | Next to menu is a 'my status' or the like; functioning something like a large telesales inbound staff coordinated by user database server for building a "hunt group" to which incoming requests are distributed. |
| 29 | No WHO button or Optional WHO button | Who dialog modifications typically require too many clicks to choose a leader. In one-on-one customer support, the leader is preferably set by the server, so there is little reason to access Who list. The lead process is preferably automated in parameter tags on the server, in order to set default environment dynamically. |
| 31 | Leader picks avatar | Leader preferably has the option to choose an avatar and pick the 'pawn' avatars. The client chooses an avatar from a collection |

| Feature | Detail |
| --- | --- |
| iSession Feature implementation list | |
| 32 Lead frame targeting | Targeting frames from the LEAD dialog may in some embodiments be IRC based, but in a larger "collaborative clicking/scrolling" solutions, clicks are preferably captured on one client, and distributed from there. |
| 33 Different avatars for client appear in support screen depending upon where in site client clicked to trigger the session. | There is preferably an avatar representing the client side person that is related to the kind of question being asked; for instance, a support avatar, or a service/parts avatar. Also corporate users are preferably allowed to specify what avatar is based on which page in their web site that iSession is launched from. Multiple avatars are allowed, and in general, features are preferably maintained though the web rather than though the client. |
| 36 Remove rooms button client side | ROOMS button on the client side is optionally removable. The Button is good for administrative view or support but in general gives too much information for students or clients |
| 37 Mininal work to set leader manually | Choosing a leader is preferably a two-click operation. In one embodiment, a "CHOOSE A LEADER" is automatically assigned in the PARAM tags for the applet, i.e., PARAM NAME = LEADER VALUE = SUPPORT |
| 38 Leader Auto Assigned | Leader is automatically assigned, based on account default setup |
| 44 Support Login Screens | Once support person types user name and password, their user name is preferably an environment variable automatically passed to the launch screen for the iSession leader, thus providing for additional automation; it also provides leaders with a kind of control panel prior to launch of iSession on support side. A Support User name is preferably automatically assigned via login. A corporate client can optionally open a viewfinder which lets them watch an iSession ("your call may be monitored at any time"). |
| 46 Support View - Ready/Not ready | Support side sets 'Ready/Not ready' on Support view GUI to set status for queuing next available agent, like call center style rotation, for distributing client sessions (Server does 'hunt group' or next available agent). |
| 51 Views - Client, Support, Support Manager/Monitor | View 1 = Client; View 2 = Support; View 3 = Monitor for support manager to view as well, to show what agents were or weren't available and alerting to overzealous support staff taking more than one iSession at a time. View 3 can be snapshot of who is doing what; Manager can modify avatars, too |
| 52 Producer View | View 5: The 'auditorium producer' or speaker view for large groups. |
| 53 Speaker View 1 | View 6: the Speaker view; the auditorium producer would be the person who sees the population. |
| 54 Speaker View 2 | Alternative view of view 6 Panel view wherein Speaker can view other speakers. |
| 60 "Drafting" | Invisible preparation and prompting of executives who lead iSessions by spawning private sessions between the executive and the prompter, so that only the executive (and not the whole room) can see and 'hear' the prompter. |

BEST MODE OF CARRYING OUT THE INVENTION

Figure 1:
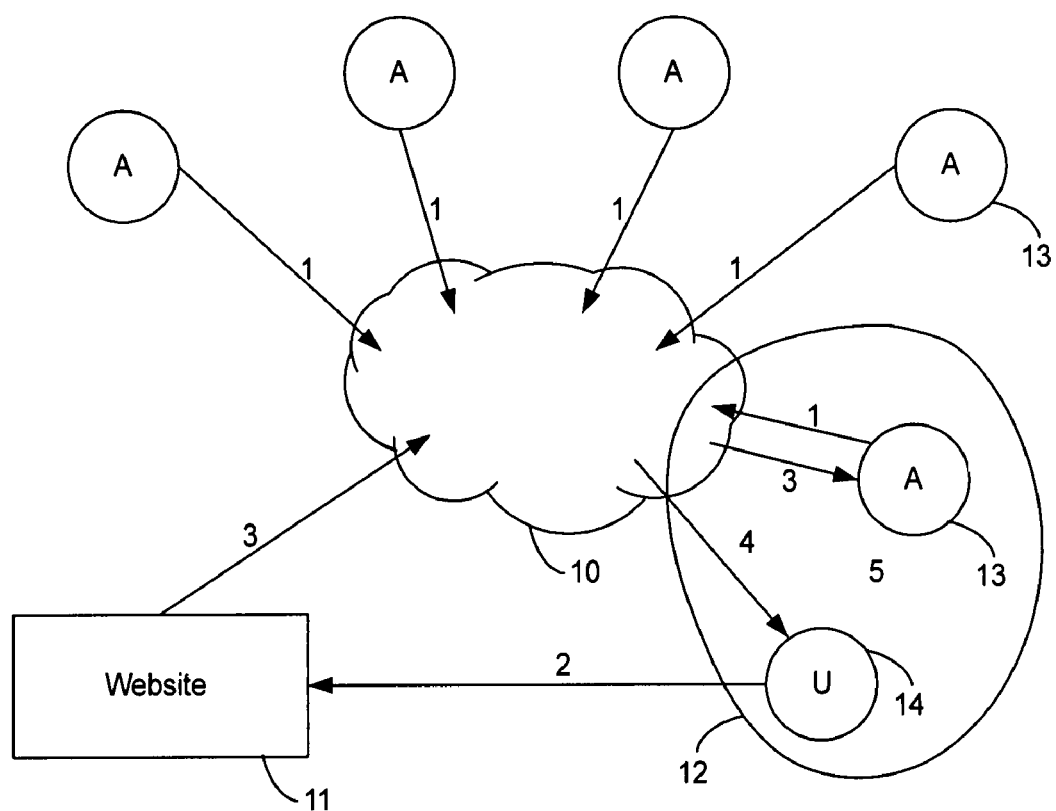
FIG. 1 is a schematic diagram/flow chart of a process of the invention.

Turning now to the drawings, the invention will be described in a preferred embodiment by reference to the numerals of the drawing figures wherein like numbers indicate like parts.

iSession Process Overview

In FIG. 1, Client's support Agents 13 (or other kinds of Agents as discussed above) log in (arrows 1) to the iSession service 10 (the iSession 'cloud' or 'switching cloud') from anywhere on the Net over dial-up or dedicated network connections. Meanwhile User 14 is browsing (arrow 2) the Client's site 11. User clicks on a special iSession hyperlink on the site tagged to suggest that help of a certain type or perhaps just help in general is available by clicking. The link is directed (arrow 3) to the iSession cloud 10, and User 14 is placed in a queue while the iSession switching cloud notifies (arrow 3) logged in Agent 13 that a User has made a Request via the link. Generally while still in the queue, the cloud distributes (arrow 14) the iSession Java client application (the iSession Viewer) to the User. Then, when the Agent responds to accept the 'call' from the switching cloud, both the Agent and the User are placed (circle 5) into an iSession channel 12 to collaborate. Any number of users can be placed into an iSession channel. When the Agent or the (last) User exits the iSession Viewer, the related iSession channel is destroyed in the switching cloud. New iSession channels can be created on the fly (about 2000 channels possible for each iSession server node).

Process Detail iSession Agent Login

An Agent visits an iSession server login process using a Java compliant browser, such as IE 4+ or Netscape 3+, over a secure connection such as SSL. Login requests from the Agent a user ID and password for authentication.

Upon submission of a user ID and password, iSession authenticates Agent against a Client's records for its Agents in the iSession database. iServer inquires of agent's state (i.e. available, on break, away from desk—these state options are desirably determined by the Agent's Client feature configuration), and annotates that state for Agent in the iSession/DB and places Agent into queue for receiving 'calls'. Agent is responsible for correct status notification after this.

Upon authentication, agent's IP address and a time/date stamp is annotated in the iSession/DB for the agent logging in. Particularized Client Agent feature configuration is extracted from the iSession/DB and a Java applet request embedded in an HTML document is built.

The Client Java applet HTML document is then web served to the Agent.

iSession User Request

Within a Java-compliant browser, User clicks on an iSession hyperlink to request access to a live one-on-one or one-to-many session. If User has previously interacted with iSession (via the current Client or any other iSession Client), iServer checks for cookies on the User's machine containing iSession login data.

IServer queries iSession/DB to authenticate requesting domain as an iSession Client. If requesting domain is not authenticated, it notifies iSession network engineers, e-mails domain administrator and informs User that this Web site, while it has a hyperlink to iSession, does not authenticate as an iSession Client, and the process ends.

Upon authentication, User's IP address and a time/date stamp is annotated in iSession/DB for the User logging in. iServer extracts Client feature configuration from iSession/DB and builds a Java applet request embedded in an HTML document. If available, it places a cookie login data into secure (SSL) iSession/User login Web page. If no cookie is available, and if User is a customer service type customer or the like, then iServer assigns a random generated user ID for User for server purposes; if User is a collaborative type user, an ID and password are requested. IServer begins caching iSession/iClient components (such as interface imagery) on the User machine in an invisible frame. In the same HTML document, the User's question to be passed to an Agent is asked for. IServer Web serves the login page to User.

User is placed in iSession queue for next available Agent or User is introduced into an existing 1-to-many collaboration channel.

IServer Web serves the client Java applet HTML document to the User.

iSession Virtual Channel Established

A virtual channel name is generated, composed of the associated iSession Client name and a time/date stamp. While the iSession Client can specify an upper cap on the number of participants allowed in a single channel, iSession does not otherwise limit channel population.

When Agent is available, iServer queries iSession/DB to ensure iSession Client seats are available for the addition of another participant. If the maximum number of iSession Client seats are in use, iServer jumps to Process: Overflow Queue.

Overflow Queue iServer is notified by database that all Agents are busy, or that all seats are occupied. iSession serves a notice page to User informing her that she has three options: 1) wait for the next available agent or seat and continue browsing the Web, 2) schedule an iSession for a later day or time, or 3) try again later (thus rescinding the iSession request).

Wait for Agent/Seat iSession server is continuously polled every five seconds by the iSession notice window via a meta refresh tag to check for an available seat or Agent. If poll fails, the notice window remains unchanged and continues polling.

Figure 2:
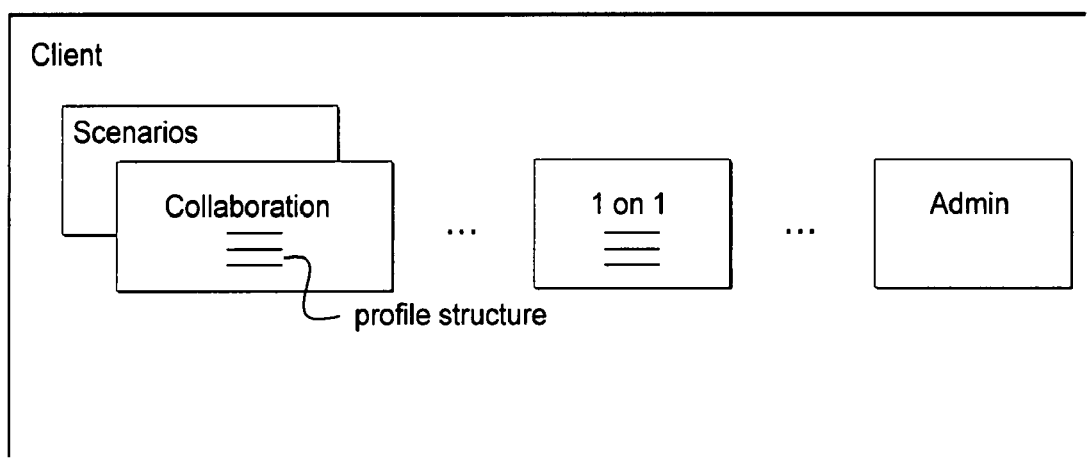
FIG. 2 is a schematic view of files aspect of the invention.

FIG. 2 shows the way stored iClient configurations are preferably ordered and arranged. Under types of scenarios for each Client, there are for example collaborative scenarios, 1-on-1 scenarios, administrative scenarios, and the like, each scenario having its own profile structure (including information on preferred graphics, avatars, ad banners or links) in XML and can be configured as default settings, archived configurations, all in the User/Agent database on the iServer.

Figure 3:
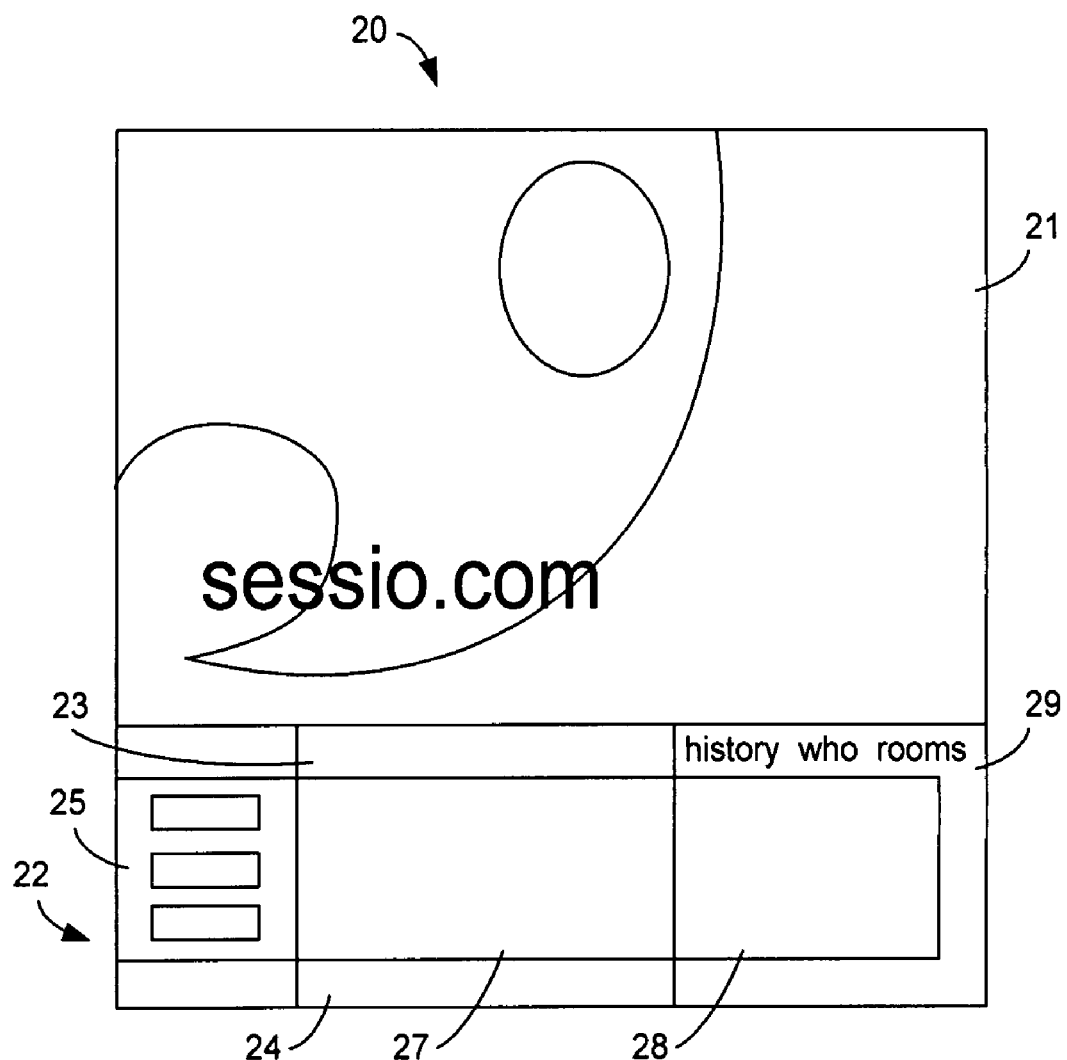
FIG. 3 is a schematic of a typical user interface screen.

In FIG. 3 a typical user interface screen 20 is schematically shown. A large area 21 is for the User's browser view and can optionally be set to float. Outside (for example, below or above the view area 21) is the chat control section 22. Other frames in section 22 include an address bar 23 for navigating or leading to a new website in the viewer, a typing bar 24 for chat input, a chat window 27 to view chat text, a button section 29 to control what shows in view window 28 (either history, who or rooms) and a control button section 25 for help, exit, and the like.

The iSession system preferably resides on a proprietary bank of controlled servers. Traffic is handed off from Client websites to the proprietary network in order for Clients to interact with their website visitors. Because of the complexity of the system infrastructure it is desirable that the network not fail at any given point, and n that it preferably run with 100% uptime reliability. A Unix platform, widely accepted as the most reliable server environment for the web, is chosen for reliability. In tests to date, the iSession system has achieved complete reliability.

INDUSTRIAL APPLICABILITY

Some benefits of using the iSession system include improved customer service leading to more deal closures, real-time collaborative research facilitating more timely solutions, and finally, the added flexibility to train individuals in the field with a more cost-effective distribution of knowledge and education.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

We claim:

1. A software distribution system comprising:
  a. a web server operated by a software distribution service, the web server operatively configured to:
    i. provide a first web site on the distributed network;
    ii. provide a second web site on the distributed network;
    iii. run a software application, the software application being:
      (1) at least partially downloadable as a thin client application to a user computing device; and
      (2) at least partially usable by the user over the distributed network as at least two operatively connected and integrated application modules, a first module being the thin client application running on the user computing device and a second module running on the web server; and
  iv. run a distribution application, the distribution application being operably configured to:
    (1) receive and store an agreement request via the second web site;
    (2) receive a request for the user to use the software application from the user via interaction with the first web site;
    (3) download the thin client application portion of the software application to the user computing device;
    (4) operatively connect the first module and the second module allowing the user to operably use the software application; and
    (5) track and store at least a portion of the data relevant to the user's usage of the software application.

2. The system of claim 1 further comprising the distribution application running on the web server being configured to:
  a. place a cookie on the user computing device;
  b. check the user computing device for the cookie before download of the thin client application; and
  c. use data imbedded in the cookie for user usage of the software application.

3. The system of claim 1 further comprising:
  a. the thin client application comprising separate, but operably connectable, sections; and
  b. the distribution application running on the web server being configured to download the thin client application to the user computing device in separate bursts of operably connectable sections.

4. The system of claim 1 further comprising:
  a. a plurality of users, second and successive users each having a user computing device running a user browser;
  b. the software application being usable over the distributed network by a plurality of users; and
  c. the distribution application running on the web server being further operably configured to:
    i. receive a plurality of user requests for software application usage;
    ii. download a copy of the thin client application to the plurality of user computing devices, each copy of the thin client application being connectable in an integrated combination over the distributed network with the same instance of the software application; and
    iii. track and store at least a portion of the data relevant to each of the plurality of user's usage of the software application.

5. The system of claim 1 further comprising the thin client application running on the user computing device being configured to operatively interact with a user browser running on the user computing device.

6. A software distribution system comprising:
  a. a first server operated by a web business, the first server providing a first web site on the distributed network;
  b. a second server operated by a software distribution service, the second server providing a second web site on the distributed network and operatively configured to:
    i. run a software application, the software application being:
      (1) at least partially downloadable as a thin client application to a user computing device; and
      (2) at least partially usable by the user over the distributed network as at least two operatively connected and integrated application modules, a first module being the thin client application running on the user computing device and a second module running on the web server; and
    ii. a distribution application running on the second server, the distribution application being operably configured to:
      (1) receive and store an agreement request via the second web site;
      (2) receive a request for the user to use the software application;
      (3) download the thin client application portion of the software application to the user computing device;
      (4) connect the user to operably use the software application while browsing the first web site; and
      (5) track and store at least a portion of the data relevant to the user's usage of the software application.

7. The system of claim 6 further comprising:
  a. a web business computing device running a web business browser.

8. The system of claim 6 further comprising the distribution application running on the second server being configured to:
  a. place a cookie on the user computing device;
  b. check the user computing device for the cookie before download of the thin client application; and
  c. use data imbedded in the cookie for user usage of the software application.

9. The system of claim 6 further comprising:
  a. the thin client application comprising separate, but operably connectable, sections; and
  b. the distribution application running on the second server being configured to download the thin client application to the user computing device in separate bursts of operably connectable sections.

10. The system of claim 6 further comprising
  a. a plurality of users, second and successive users each having a user computing device running a user browser;
  b. the software application being usable over the distributed network by a plurality of users;
  c. the distribution application running on the second server being further operably configured to:
    i receive a plurality of user requests for software application usage;
    ii. download a copy of the thin client application to each of the plurality of user computing devices, each thin client application being connectable in an integrated combination over the distributed network with the same instance of the software application; and
    iii. track and store at least a portion of the data relevant to each of the plurality of user's usage of the software application.

11. The system of claim 6 further comprising the thin client application running on the user computing device being configured to operatively interact with a user browser running on the user computing device.

12. A method of providing software distribution, said method comprising the following steps:
  a. a software distribution service providing a first web site accessible over the distributed network;
  b. the software distribution service also providing a second web site on the distributed network and running a software application on a web server, the software application being usable over the distributed network by agreement with the software distribution service;
  c. receiving and storing an agreement request via the second web site;
  d. receiving a request for software application usage from a user via interaction with the first web site;

e. the software distribution service downloading a thin client application to the user's computing device running a browser, the thin client application being connectable in an integrated combination over the distributed network with the software application;
f. connecting the thin client application running on the user's computing device with the software application running on the web server, the user thereby operably using the software application; and
g. tracking and storing at least a portion of the data relevant to the user's usage of the software application.

13. The method of claim 12 further comprising:
a. at least one more user running at least one more browser operably connected to the distributed network on at least one more computing device;
b. following step 26.g, receiving at least one more user request for software application usage through the distributed network;
c. downloading a thin client application to each of the at least one more user's computing devices, each thin client application being connectable in an integrated combination over the distributed network with the same instance of the software application; and
d. storing data relevant to each of the at least one more user's usage of the software application.

14. A method of providing software distribution, said method comprising the following steps:
a. a web business providing a first web site accessible over the distributed network;
b. a software distribution service providing a second web site over the distributed network and running a software application, the software application being usable over the distributed network by agreement with the software distribution service;
c. receiving and storing an agreement request via the second web site;
d. receiving a request for software application usage from a user via interaction with the first web site;
e. the software distribution service downloading a thin client application to the user's computing device running a browser, the thin client application being connectable in an integrated combination over the distributed network with the software application;
f. connecting the user to operably use the software application while browsing the first web site; and
g. tracking and storing at least a portion of the data relevant to the user's usage of the software application.

15. The method of claim 14 further comprising, after step 28.h, invoicing the web business for the user's usage.

16. The method of claim 15 further comprising, in the step of invoicing the web business, invoicing based upon the number of instances of use by the user of the software application.

17. The method of claim 15 further comprising, in the step of invoicing the web business, invoicing the web business based upon the duration of use by the user of the software application.

18. The method of claim 14 further comprising between steps 28.d and 28.e:
a. the user clicking on a hyperlink on the first web site; and
b. generating a user request for software application usage from the hyperlink click.

19. The method of claim 14 further comprising, in step 28.f, downloading the thin client application to the user in separate bursts of operably connectable sections.

20. The method of claim 14 further comprising, after step 28.d, a step of updating the software application.

21. The method of claim 14 further comprising:
a. in step 28.a, at least one more user running at least one more browser operably connected to the distributed network on at least one more computing device;
b. following step 28.h, receiving at least one more user request for software application usage through the distributed network;
c. downloading a thin client application to each of the at least one more user's computing device, each thin client application being connectable in an integrated combination over the distributed network with the same instance of the software application; and
d. storing data relevant to each of the at least one more user's usage of the software application.

* * * * *